 (12) United States Patent
Hsiang et al.

(10) Patent No.: US 11,146,824 B2
(45) Date of Patent: Oct. 12, 2021

(54) VIDEO ENCODING OR DECODING METHODS AND APPARATUSES RELATED TO HIGH-LEVEL INFORMATION SIGNALING

(71) Applicant: MEDIATEK INC., Hsinchu (TW)

(72) Inventors: Shih-Ta Hsiang, Hsinchu (TW); Ching-Yeh Chen, Hsinchu (TW); Tzu-Der Chuang, Hsinchu (TW); Lulin Chen, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/134,672

(22) Filed: Dec. 28, 2020

(65) Prior Publication Data

US 2021/0203996 A1 Jul. 1, 2021

Related U.S. Application Data

(60) Provisional application No. 62/955,539, filed on Dec. 31, 2019, provisional application No. 62/955,364, filed on Dec. 30, 2019.

(51) Int. Cl.
*H04N 19/70* (2014.01)
*H04N 19/172* (2014.01)
(Continued)

(52) U.S. Cl.
CPC .......... *H04N 19/70* (2014.11); *H04N 19/105* (2014.11); *H04N 19/119* (2014.11);
(Continued)

(58) Field of Classification Search
CPC .............................. H04N 19/70; H04N 19/132
See application file for complete search history.

(56) References Cited

U.S. PATENT DOCUMENTS 9,998,735 B2 6/2018 Chen et al.
10,499,068 B2 12/2019 Hannuksela
(Continued)

FOREIGN PATENT DOCUMENTS

CN 105052152 A 11/2015
CN 107431819 A 12/2017
CN 107566848 A 1/2018

OTHER PUBLICATIONS

Nishi: AHG17: Clean-up on disabling temporal motion vector prediction in case of reference picture resampling; publication date 2019.*

(Continued)

*Primary Examiner* — Jerry T Jean Baptiste
(74) *Attorney, Agent, or Firm* — McClure, Qualey & Rodack, LLP (57) ABSTRACT

Video processing methods and apparatuses for processing video pictures referring to a high-level syntax set include receiving input data, determining a first syntax element indicating whether reference picture resampling is disabled or constrained, determining a second syntax element indicating whether subpicture partitioning is disabled or constrained, and encoding or decoding the video pictures. The first and second syntax elements are restricted to disable or constrain subpicture partitioning when reference picture resampling is enabled or disable or constrain reference picture resampling when subpicture partitioning is enabled. The first syntax element and the second syntax element are syntax elements signaled in the high level syntax set.

17 Claims, 7 Drawing Sheets

(51) Int. Cl.
*H04N 19/132* (2014.01)
*H04N 19/33* (2014.01)
*H04N 19/119* (2014.01)
*H04N 19/105* (2014.01)
*H04N 19/159* (2014.01)

(52) U.S. Cl.
CPC ......... *H04N 19/132* (2014.11); *H04N 19/159* (2014.11); *H04N 19/172* (2014.11); *H04N 19/33* (2014.11)

(56) References Cited

U.S. PATENT DOCUMENTS

| | | |
|---|---|---|
| 10,812,835 B2 | 10/2020 | Wang et al. |
| 2014/0219363 A1* | 8/2014 | Seregin .................. H04N 19/70 375/240.26 |
| 2015/0016543 A1* | 1/2015 | Rapaka ................ H04N 19/105 375/240.25 |
| 2018/0376126 A1 | 12/2018 | Hannuksela |

OTHER PUBLICATIONS

International Search Report dated Mar. 26, 2021, issued in application No. PCT/CN2020/141402.
Nishi, T., et al.; "AHG17; Clean-up on disabling temporal motion vector prediction in case of reference picture resampling;" Joint Video Experts Team (JVET) of ITU-T SG 16 WP 3 and ISO/IEC JTC 1/SC 29/WG 11; Oct. 2019; pp. 1-3.

* cited by examiner

Fig. 7

VIDEO ENCODING OR DECODING METHODS AND APPARATUSES RELATED TO HIGH-LEVEL INFORMATION SIGNALING

CROSS REFERENCE TO RELATED APPLICATION

The present invention claims priority to U.S. Provisional Patent Application, Ser. No. 62/955,364, filed on Dec. 30, 2019, entitled "Methods and apparatus related to high-level information signaling for coding image and video data", and U.S. Provisional Patent Application, Ser. No. 62/955,539, filed on Dec. 31, 2019, entitled "Methods and apparatus related to high-level information signaling for coding image and video data". The U.S. Provisional Patent Applications are hereby incorporated by reference in their entireties.

FIELD OF THE INVENTION

The present invention relates to video processing methods and apparatuses in video encoding and decoding systems. In particular, the present invention relates to high-level information signaling for reference picture resampling and sub-picture partitioning.

BACKGROUND AND RELATED ART

Figure 1:
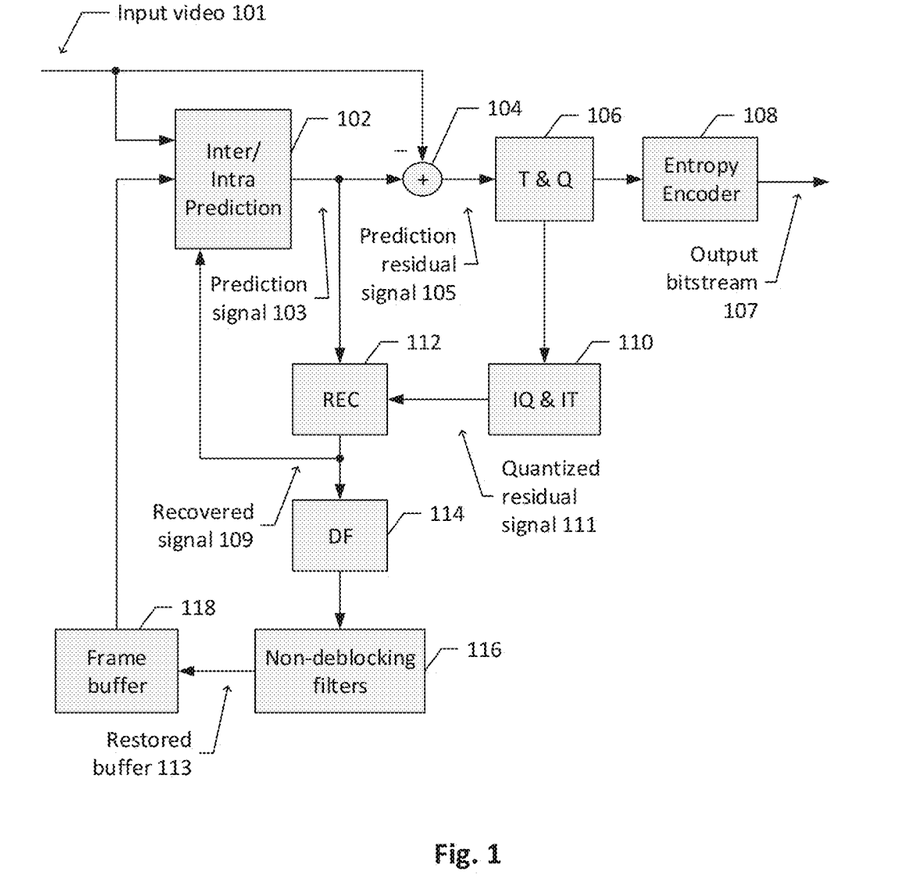
FIG. 1 illustrates a system block diagram of a video encoding system implementing various coding tools in the HEVC standard.

The Versatile Video Coding (VVC) standard is the upcoming emerging video coding standard which has been developed incrementally based on the former High Efficiency Video Coding (HEVC) standard by enhancing existing coding tools and introducing multiple new coding tools in various building blocks of the codec structure. FIG. 1 illustrates a block diagram of a HEVC encoding system. An input video signal 101 is predicted by an Intra or Inter Prediction module 102 to form a prediction signal 103, which is derived from coded picture regions. A prediction residual signal 105 between the input video signal 101 and the prediction signal 103 is processed by a linear transform in a Transform and Quantization module 106. Transform coefficients are quantized in the Transform and Quantization module 106 and entropy coded together with other side information in an Entropy Coding module 108 to form a video bitstream 107. A reconstructed signal 109 is generated by a Reconstruction module 112 from the prediction signal 103 and a quantized residual signal 111, where the quantized residual signal 111 is generated by an Inverse Quantization and Inverse Transform 110 after inverse transforming on de-quantized transform coefficients. The reconstructed signal 109 is further processed by in-loop filtering in a Deblocking Filter 114 and Non-Deblocking Filters 116 for removing coding artifacts. The decoded pictures 113 are stored in a Frame Buffer 118 for predicting future pictures in the input video signal 101. In the HEVC standard, a coded picture is partitioned into non-overlapped square block regions represented by associated Coding Tree Units (CTUs). A coded picture can be represented by a collection of slices, each comprising an integer number of CTUs. The individual CTUs in a slice are processed in a raster scanning order. A Bi-predictive (B) slice may be decoded using intra prediction or inter prediction by referencing at most two motion vectors and reference indices to predict sample values of each block. A Predictive (P) slice is decoded using intra prediction or inter prediction by referencing at most one motion vector and reference index to predict sample values of each block. An Intra (I) slice is decoded using intra prediction only.

Figure 2A:
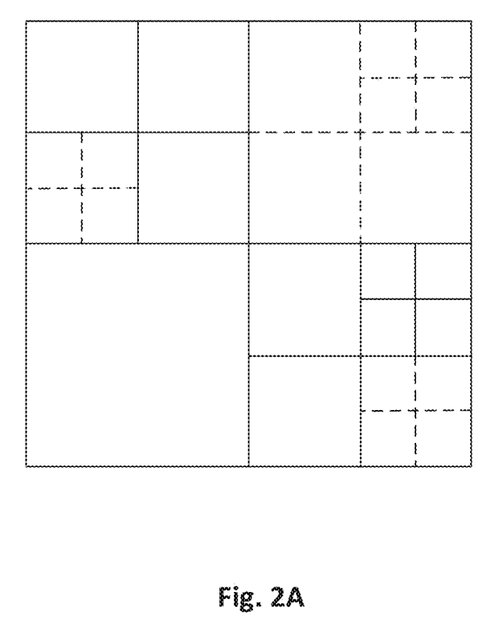
FIG. 2A demonstrates an example of block partitioning within a coding tree unit according to the HEVC standard.
Figure 2B:
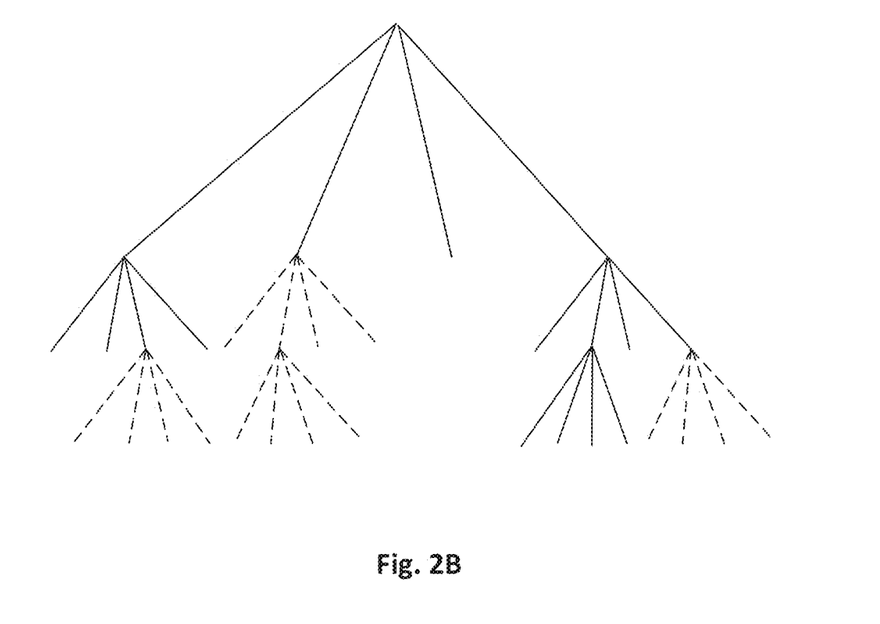
FIG. 2B illustrates a quad-tree-based coding tree representation corresponding to the coding tree unit as shown in FIG. 2A.

A CTU can be partitioned into multiple non-overlapped Coding Units (CUs) using a recursive QuadTree (QT) structure to adapt to various local motion and texture characteristics. One or more Prediction Unit (PU) are specified for each CU. The PU, together with the associated CU syntax, works as a basic unit for signaling the predictor information. The specified prediction process is employed to predict values of the associated pixel samples inside the PU. A CU can be further partitioned using the Residual QuadTree (RQT) structure for representing the associated prediction residual signal. The leaf nodes of the RQT correspond to Transform Units (TUs). A TU is composed of a Transform Block (TB) of luma samples of size 8×8, 16×16, or 32×32, or four TBs of luma samples of size 4×4, and two corresponding TBs of chroma samples of a picture in 4:2:0 color format. An integer transform is applied to a TB and level values of quantized coefficients together with other side information are entropy coded in the video bitstream. FIG. 2A illustrates an example of a block partitioning of an exemplary CTU and FIG. 2B illustrates its corresponding QT representation. The solid lines in both FIG. 2A and FIG. 2B indicate CU boundaries inside the CTU and the dashed lines indicate TU boundaries inside the CTU. The term Coding Tree Block (CTB), Coding Blocking (CB), Prediction Block (PB), and Transform Block (TB) are defined to specify the 2-D sample array of one color component associated with CTU, CU, PU, and TU respectively. A CTU consists of one luma CTB, two chroma CTBs, and associated syntax elements. A similar relationship is valid for CU, PU, and TU. The tree partitioning is generally applied simultaneously to both luma and chroma components, although exceptions apply when certain minimum sizes are reached for the chroma components.

The VVC standard improves compression performance and efficiency of transmission and storage, and supports new formats such as the High Dynamic Range and omni-directional 360 video. A video picture encoded by the VVC standard is partitioned into non-overlapped square block regions represented by CTUs, similar to the HEVC standard. Each CTU is partitioned into one or more smaller size CUs by a quadtree with nested multi-type tree using binary and ternary splitting. Each of the resulting CU partitions is in a square or rectangular shape. The VVC standard makes video transmission in mobile networks more efficiently as it allows systems or locations with poor data rates to receive larger files more quickly. The VVC standard supports layer coding, spatial or Signal to Noise Ratio (SNR) temporal scalability.

Figure 3:
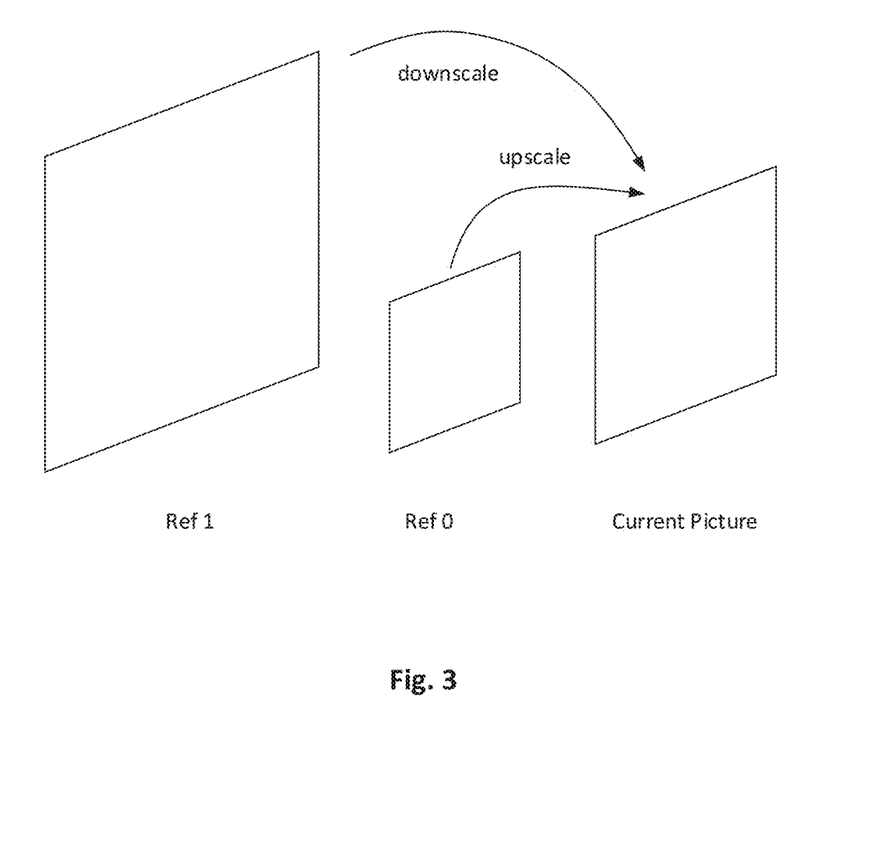
FIG. 3 illustrates an exemplary example of enabling reference picture resampling.

Reference Picture Resampling (RPR) In the VVC standard, fast representation switching for adaptive streaming services is desired to deliver multiple representations of the same video content at the same time, each having different properties. Different properties involve with different spatial resolutions or different sample bit depths. In real-time video communications, by allowing resolution changes within a coded video sequence without inserting an I-picture, not only the video data can be adapted to dynamic channel conditions and user preference seamlessly, but the beating effect caused by the I-pictures can also be removed. Reference Picture Resampling (RPR) allows pictures with different resolutions can reference each other in inter prediction. RPR provides higher coding efficiency for adaptation of the spatial resolution and bit rate, in both conversational and streaming applications. RPR also can be used in application scenario when zooming of the entire video region or some region of interest is needed. FIG. 3 illustrates an example of applying reference picture resampling to encode or decode a current picture, where inter coded blocks of the current picture are predicted from reference pictures with same or different sizes. The picture size of the reference picture can be different from the current picture when spatial scalability is supported as spatial scalability is beneficial in streaming applications. RPR is adopted in the VVC standard to support the on-the-fly upsampling and downsampling motion compensation.

A current picture size and resolution scaling parameters are signaled in a Picture Parameter Set (PPS), and a maximum picture size in the picture width and height for a Coded Layer Video Sequence (CLVS) is specified in a Sequence Parameter Set (SPS). Video pictures in one CLVS are pictures associated with the same SPS and in the same layer. Table 1 shows an example of signaling an RPR enabling flag and a maximum picture size in a SPS. A RPR enabling flag sps_ref_pic_resampling_enabled_flag signaled in a Sequence Parameter Set (SPS) is used to indicate whether RPR is enabled for pictures referring to the SPS. When this RPR enabling flag is equal to 1, a current picture referring to the SPS may have slices that refer to a reference picture in an active entry of a reference picture layer that has one or more of the following seven parameters different than that of the current picture. The seven parameters include syntax elements associated with a picture width pps_pic_width_in_luma_samples, a picture height pps_pic_height_in_luma_samples, a left scaling window offset pps_scaling_win_left_offset, a right scaling window offset pps_scaling_win_right_offset, a top scaling window offset pps_scaling_win_top_offset, a bottom scaling window offset pps_scaling_win_bottom_offset, and a number of sub-pictures sps_num_subpics_minus1. For a current picture referring to a reference picture that has one or more of these seven parameters different than that of the current picture, the reference picture could either belong to the same layer or a different layer than the layer containing the current picture. The syntax element sps_res_change_in_clvs_allowed_flag equals to 1 specifying that the picture spatial resolution might change within a CLVS referring to the SPS, and this syntax element equals to 0 specifying that the picture spatial resolution does not change within any CLVS referring to the SPS. When this syntax element sps_res_change_in_clvs_allowed_flag is not present in the SPS, the value is inferred to be equal to 0. The maximum picture size is signaled in the SPS by syntax elements sps_pic_width_max_in_luma_samples and sps_pic_height_max_in_luma_samples, and the maximum picture size shall not be larger than the Output Layer Set (OLS) Decoded Picture Buffer (DPB) picture size signaled in the corresponding Video Parameter Set (VPS). Syntax elements associated with RPR signaled in a SPS are illustrated in Table 1.

TABLE 1

| seq_parameter_set_rbsp( ) { | Descriptor |
|---|---|
| ... | |
| sps_ref_pic_resampling_enabled_flag | u(1) |
| if (sps_ref_pic_resampling_enabled_flag) | |
| sps_res_change_in_clvs_allowed_flag | u(1) |
| sps_pic_width_max_in_luma_samples | ue(v) |
| Sps_pic_height_max_in_luma_samples | ue(v) |

Syntax elements related to RPR signaled in a PPS are shown in Table 2. The syntax element pic_width_in_luma_samples specifies the width of each decoded picture referring to the PPS in units of luma samples. This syntax element shall not be equal to 0 and shall be an integer multiple of Max(8, MinCbSizeY), and is constrained to be less than or equal to sps_pic_width_max_in_luma_samples signaled in the corresponding SPS. The value of this syntax element pic_width_in_luma_samples shall be equal to sps_pic_width_max_in_luma_samples when a subpicture present flag subpics_present_flag is equal to 1 or when the RPR enabling flag ref_pic_resampling_enabled_flag is equal to 0. The syntax element pic_height_in_luma_samples specifies the height of each decoded picture referring to the PPS in units of luma samples. This syntax element shall not be equal to 0 and shall be an integer multiple of Max(8, MinCbSizeY), and shall be less than or equal to sps_pic_height_max_in_luma_samples. The value of the syntax element pic_height_in_luma_samples is set to be equal to sps_pic_height_max_in_luma_samples when the subpicture present flag subpics_present_flag is equal to 1 or when the RPR enabling flag ref_pic_resampling_enabled_flag is equal to 0.

Table 2

| pic_parameter_set_rbsp( ) { | Descriptor |
|---|---|
| pps_pic_parameter_set_id | ue(v) |
| pps_seq_parameter_set_id | u(4) |
| pic_width_in_luma_samples | ue(v) |
| pic_height_in_luma_samples | ue(v) |
| conformance_window_flag | u(1) |
| if(conformance_window_flag) { | |
| conf_win_left_offset | ue(v) |
| conf_win_right_offset | ue(v) |
| conf_win_top_offset | ue(v) |
| conf_win_bottom_offset | ue(v) |
| } | |
| scaling_window_flag | u(1) |
| if(scaling_window_flag) { | |
| scaling_win_left_offset | ue(v) |
| scaling_win_right_offset | ue(v) |
| scaling_win_top_offset | ue(v) |
| scaling_win_bottom_offset | ue(v) |
| } | |
| ... | |

The syntax element scaling_window_flag equals to 1 specifying scaling window offset parameters are present in the PPS, and scaling_window_flag equals to 0 specifying scaling window offset parameters are not present in the PPS. The value of this syntax element scaling_window_flag shall be equal to 0 when a RPR enabling flag ref_pic_resampling_enabled_flag is equal to 0. The syntax elements scaling_win_left_offset, scaling_win_right_offset, scaling_win_top_offset, and scaling_win_bottom_offset specify the scaling offsets in units of luma samples. These scaling offsets are applied to the picture size for scaling ratio calculation. The scaling offsets can be negative values. The values of these four scaling offset syntax elements, scaling_win_left_offset, scaling_win_right_offset, scaling_win_top_offset, and scaling_win_bottom_offset are inferred to be equal to 0 when a scaling window flag scaling_window_flag is equal to 0.

When predicting a current block in a current picture using RPR, a scaling ratio is derived from a scaling window size specified by these PPS syntax elements including scaling_win_left_offset, scaling_win_right_offset, scaling_win_top_offset, and scaling_win_bottom_offset. The variables PicOutputWidthL and PicOutputHeightL representing a scaling window width and a scaling window height are derived as follows:

PicOutputWidthL=pic_width_in_luma_samples−(scaling_win_right_offset+scaling_win_left_offset).

PicOutputHeightL=pic_height_in_luma_samples−(scaling_win_bottom_offset+scaling_win_top_offset).

The variable PicOutputWidthL representing the scaling window width is derived by subtracting the right and left offsets from the picture width, and the variable PicOutputHeightL representing the scaling window height is derived by subtracting the top and bottom offsets from the picture height. The value of a sum of the left and right offsets scaling_win_left_offset and scaling_win_right_offset shall be less than the picture width pic_width_in_luma_samples, and the value of a sum of the top and bottom offsets scaling_win_top_offset and scaling_win_bottom_offset shall be less than the picture height pic_height_in_luma_samples.

In a more recent proposal of the VVC standard, the scaling window offsets are measured in chroma samples, and when these scaling window offset syntax elements are not present in the PPS, the values of these four scaling offset syntax elements scaling_win_left_offset, scaling_win_right_offset, scaling_win_top_offset, and scaling_win_bottom_offset are inferred to be equal to conf_win_left_offset, conf_win_right_offset, conf_win_top_offset, and conf_win_bottom_offset, respectively. A variable CurrPicScalWinWidthL indicating the scaling window width is derived by the picture width, the variable SubWidthC, the left scaling offset, and the right scaling offset. A variable CurrPicScalWinHeightL indicating the scaling window height is derived by the picture height, the variable SubHeightC, the top scaling offset, and the bottom scaling offset as shown in the following. For example, the scaling window width and the scaling window height are derived by the following equations. CurrPicScalWinWidthL=pic_width_in_luma_samples−SubWidthC*(scaling_win_right_offset+scaling_win_left_offset); and CurrPicScalWinHeightL= pic_height_in_luma_samples−SubHeightC*(scaling_win_bottom_offset+scaling_win_top_offset).

Subpicture Partitioning In the VVC standard, a picture may be further divided into one or more subpictures for encoding and decoding. Subpictures proposed in the VVC standard are similar to Motion-Constrained Tile Sets (MCTSs) in the HEVC standard. This coding tool allows independent coding and extraction of a rectangular subset of a sequence of coded picture, for the cases like viewport-dependent 360-degree video streaming optimization and region of interest applications. Subpicture allows motion vectors of a coding block pointing outside of the subpicture even when the subpicture is extractable thus allowing padding at subpicture boundaries in this case. The layout of subpicture in the VVC standard is signaled in the SPS, thus the layout of subpicture is constant within a CLVS. Each subpicture consists of one or more complete rectangular slices. A subpicture Identification (ID) can be optionally assigned to each subpicture. Table 3 shows exemplary syntax elements associated with subpicture partitioning signaled in a SPS.

Table 3

| seq_parameter_set_rbsp( ) { | Descriptor |
|---|---|
| subpics_present_flag | u(1) |
| if (subpics_present_flag) { | |
| sps_num_subpics_minus1 | u(8) |
| for (i = 0; i <= sps_num_subpics_minus1; i++) { | |
| subpic_ctu_top_left_x [i] | u(v) |
| subpic_ctu_top_left_y [i] | u(v) |
| subpic_width_minus1[i] | u(v) |
| subpic_height_minus1[i] | u(v) |
| subpic_treated_as_pic_flag[i] | u(1) |
| loop_filter_across_subpic_enabled_flag[i] | u(1) |
| } | |
| } | |
| sps_subpics_id_present_flag | u(1) |
| if (sps_subpics_id_present_flag) { | |
| sps_subpic_id_signalling_present_flag | u(1) |
| if (sps_subpics_id_signalling_present_flag) { | |
| sps_subpic_id_len_minus1 | ue(1) |
| for (i = 0; i <= sps_num_subpics_minus1; i++) | |
| sps_subpic_id[i] | u(v) |
| } | |
| } | |

BRIEF SUMMARY OF THE INVENTION

In exemplary embodiments of a video processing method for processing video data, a video encoding or decoding system implementing the video processing method receives input video data associated with video pictures referring to a high-level syntax set, determines a first syntax element signaled or to be signaled in the high-level syntax set indicating whether RPR is disabled or constrained for the video picture associated with the high-level syntax set, determines a second syntax element indicating whether subpicture partitioning is disabled or constrained for the video pictures associated with the high-level syntax set, encodes or decodes the video pictures by allowing pictures with different resolutions to be referenced in inter prediction when RPR is enabled or allowing pictures only with a same resolution to be referenced in inter prediction when RRP is disabled, and encodes or decodes the video pictures by dividing each picture into one or more subpictures when subpicture partitioning is enabled or by processing each picture without dividing into subpictures when subpicture partitioning is disabled. In some embodiments, the first syntax element and the second syntax element are restricted to disable or constrain subpicture partitioning when RPR is enabled. An example of the high-level syntax set is a Sequence Parameter Set. In some embodiments, the second syntax element is conditionally signaled in the high-level syntax set as the second syntax element is only signaled when RPR is disabled, that is subpicture partitioning is only allowed when RPR is disabled.

In some embodiments, all the video pictures referring to the high-level syntax set have a same derived value of a scaling window width and a same derived value of a scaling window height when subpicture partitioning is enabled. The scaling window width for a picture is derived from a picture width, a left scaling window offset, and a right scaling window offset signaled in a Picture Parameter Set (PPS) referred to by the picture, and the scaling window height for the picture is derived from a picture height, a top scaling window offset, and a bottom scaling window offset. In cases the scaling window offsets are measured in chroma samples, the scaling window width and height are further derived by variables SubWidthC and SubHeightC respectively.

In accordance with some embodiments, the first and second syntax elements are restricted to disable or constrain subpicture partitioning when RPR is enabled or the first and second syntax elements are restricted to disable or constrain RPR when subpicture partitioning is enabled. In one embodiment, the first syntax element is conditionally signaled in the high-level syntax set and the first syntax element is only signaled when subpicture partitioning is disabled. In some specific embodiments, the first syntax element is a RPR enabling flag specifying whether RPR is enabled, and the second syntax element is a subpicture partitioning present flag specifying whether subpicture parameters are present in the high-level syntax set. In one embodiment, the RPR enabling flag is inferred to be equal to 0 or is not signaled when the subpicture partitioning present flag is equal to 1, and the RPR enabling flag is only signaled in the high-level syntax set when the subpicture partitioning present flag is equal to 0. The RPR enabling flag is inferred to be equal to 0 when the RPR enabling flag is not signaled. In another embodiment, the subpicture partitioning present flag is inferred to be equal to 0 or is not signaled when the RPR enabling flag is equal to 1, and the subpicture partitioning present flag is only signaled in the high-level syntax set when the RPR enabling flag is equal to 0. The subpicture partitioning present flag is inferred to be equal to 0 when the subpicture present flag is not signaled.

In an embodiment, the first syntax element is a resolution change flag specifying whether a picture spatial resolution is changeable within a CLVS, and the second syntax element is a subpicture partitioning present flag specifying whether subpicture information is present for the CLVS in the high-level syntax set. In this embodiment, the subpicture information is not present for the CLVS in the high-level syntax set when the picture spatial resolution is changeable within the CLVS referring to the high-level syntax set by inferring subpicture partitioning present flag to be equal to 0 when the resolution change flag is equal to 1.

An embodiment of the video processing method further includes determining a third syntax element according to the second syntax element. The second syntax element in this embodiment is a subpicture partitioning present flag specifying whether subpicture information is present for a CLVS in the high-level syntax set, and the third syntax element is a subpicture ID flag specifying whether subpicture ID mapping is present in the high-level syntax set. The video processing method determines a related subpicture layout when the subpicture partitioning present flag is equal to 1. The subpicture ID flag is not coded and is inferred to be equal to 0 when the subpicture partitioning present flag is equal to 0, and the subpicture ID flag is only signaled in the high-level syntax set when the subpicture partitioning present flag is equal to 1.

Aspects of the disclosure further provide an apparatus for video processing in a video encoding or decoding system, the apparatus comprising one or more electronic circuits configured for receiving input video data of video pictures referring to a high-level syntax set, determining a first syntax element signaled or to be signaled in the high-level syntax set indicating whether RPR is disabled or constrained, determining a second syntax element indicating whether subpicture partitioning is disabled or constrained, and encoding or decoding the video pictures by allowing pictures with different resolutions to be referenced in inter prediction when RPR is enabled or encoding or decoding the video pictures by dividing each picture into one or more subpictures when subpicture partitioning is enabled. Embodiments of video encoding or decoding system encodes or decodes video pictures according to a bitstream conformance requirement which disables or constrains subpicture partitioning when RPR is enabled or disables or constrains RPR when subpicture partitioning is enabled.

Aspects of the disclosure further provide a non-transitory computer readable medium storing program instructions for causing a processing circuit of an apparatus to perform a video processing method to encode or decode video pictures referring to a high-level syntax set. The video processing method encodes or decodes the video pictures by disabling or constraining subpicture partitioning when RPR is enabled or disabling or constraining RPR when subpicture partitioning is enabled. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, and wherein.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Same Scaling Window for Same Picture Size In cases when subpicture partitioning is enabled, it is a requirement of the bitstream conformance that all pictures referring to the same SPS shall have the same picture size as the maximum picture size specified in the SPS. However, when all the pictures referring to the same SPS have the same picture size but different spatial scaling parameters, coding parameters related to signaling spatial positions and partitions such as subpicture layout specified in the SPS may not be consistent from picture to picture in a coded video sequence. In some embodiments of the present invention, values of the scaling parameters are constrained to be the same for any two pictures referring to the same SPS when these two pictures have the same picture size. In this way, all the pictures referring to the same SPS and having the same picture size will have same derived values of the scaling window width PicOutputWidthL and scaling window height PicOutputHeightL respectively. The proposed modifications to the semantics associated with the picture parameter set RBSP according to an embodiment are provided as follows.

A syntax element scaling_window_flag equals to 1 specifying that scaling window offset parameters are present in the PPS, and scaling_window_flag equals to 0 specifying that the scaling window offset parameters are not present in the PPS. When a syntax element ref_pic_resampling_enabled_flag is equal to 0, the value of scaling_window_flag shall be equal to 0. Scaling window offset parameters scaling_win_left_offset, scaling_win_right_offset, scaling_win_top_offset, and scaling_win_bottom_offset specify the offsets, in units of luma samples, that are applied to the picture size for scaling ratio calculation. When the syntax element scaling_window_flag is equal to 0, the values of these four scaling window offset parameters are inferred to be equal to 0. The value of a sum of the left and right scaling window offsets of a picture shall be less than the picture width pic_width_in_luma_samples, and the value of a sum of the top and bottom scaling window offsets shall be less than the picture height pic_height_in_luma_samples. The variables scaling window width PicOutputWidthL and scaling window height PicOutputHeightL are derived as follows: PicOutputWidthL=pic_width_in_luma_samples−(scaling_win_right_offset+scaling_win_left_offset), and PicOutputHeightL=pic_height_in_luma_samples−(scaling_win_bottom_offset+scaling_win_top_offset). Let ppsA and ppsB be any two PPSs referring to the same SPS. It is a requirement of the bitstream conformance that, when ppsA and ppsB have the same values of pic_width_in_luma_samples and pic_height_in_luma_samples, respectively, ppsA and ppsB shall have the same values of scaling_win_left_offset, scaling_win_right_offset, scaling_win_top_offset, and scaling_win_bottom_offset, respectively.

Same Scaling Window when Enabling Certain Tools In some embodiments, the same scaling window constraint is applied when at least one of certain assigned sets of tools is enabled. In one example, subpicture partitioning is one of the certain assigned sets of tools, so the same scaling window constraint is applied when subpicture partitioning is enabled. In this way, all the pictures referring to the same SPS shall have the same derived values of the scaling window width PicOutputWidthL and scaling window height PicOutputHeightL, respectively, when a subpicture present flag subpics_present_flag is equal to 1. In an embodiment, when subpicture partitioning is enabled, the same scaling window constraint restricts all pictures referring to the same SPS to have the same scaling window offsets parameters scaling_win_left_offset, scaling_win_right_offset, scaling_win_top_offset, and scaling_win_bottomg_offset. The proposed modifications to the semantics associated with the picture parameter set RBSP are provided as follows. The syntax element scaling_window_flag equals to 1 specifying that the scaling window offset parameters are present in the PPS, and scaling_window_flag equals to 0 specifying that the scaling window offset parameters are not present in the PPS. When a reference picture resampling enabled flag ref_pic_resampling_enabled_flag is equal to 0, the value of scaling_window_flag shall be equal to 0. The scaling window offset parameters scaling_win_left_offset, scaling_win_ right_offset, scaling_win_top_offset, and scaling_win_bottom_offset specify the scaling window offsets, in units of luma samples, that are applied to the picture size for scaling ratio calculation. When the syntax element scaling_window_flag is equal to 0, the values of scaling_win_left_offset, scaling_win_right_offset, scaling_win_top_offset, and scaling_win_bottom_offset are inferred to be equal to 0. The value of a sum of the left and right scaling window offsets of a picture shall be less than the picture width pic_width_in_luma_samples, and the value of a sum of the top and bottom scaling window offsets shall be less than the picture height pic_height_in_luma_samples. The variables scaling window width PicOutputWidthL and scaling window height PicOutputHeightL are derived as follows: PicOutputWidthL=pic_width_in_luma_samples−(scaling_win_right_offset+scaling_win_left_offset), and PicOutputHeightL=pic_height_in_luma_samples−(scaling_win_bottom_offset+scaling_win_top_offset). Let ppsA and ppsB be any two PPSs referring to the same SPS. In this embodiment, it is a requirement of the bitstream conformance that, when the subpicture present flag subpics_present_flag signaled in the SPS is equal to 1, ppsA and ppsB shall have the same values of scaling_win_left_offset, scaling_win_right_offset, scaling_win_top_offset, and scaling_win_bottom_offset, respectively.

Disabling Reference Picture Resampling when Enabling Certain Tools In some embodiments, a video encoder or decoder disables or constrains the use of RPR when certain assigned sets of coding tools are enabled. In some other equivalent embodiments, a video encoder or decoder disables or constrains the use of certain assigned sets of coding tools when RPR is enabled. In a specific embodiment, the certain assigned sets of coding tools include subpicture partitioning, and the video encoder or decoder encodes or decodes video data according to a bitstream conformance requirement which disables RPR when subpicture partitioning is enabled. For example, the syntax element associated with a RPR enabling flag ref_pic_resampling_enabled_flag signaled in a SPS shall be equal to 0 when a subpicture partitioning present flag subpics_present_flag is equal to 1. In this way, since RPR is disabled when subpicture partitioning is enabled, all the pictures referring to the same SPS shall have the same derived values of the scaling window width PicOutputWidthL and scaling window height PicOutputHeightL, respectively, when the subpicture partitioning present flag subpics_present_flag is equal to 1. In an alternative embodiment, the video encoder or decoder encodes or decodes video data according to a bitstream conformance requirement which disables subpicture partitioning when RPR is enabled. For example, the video encoder or decoder infers the value of a subpicture partitioning present flag subpics_present_flag to be equal to 0 when a RPR enabling flag ref_pic_resampling_enabled_flag is equal to 1. Table 4 shows an example of a modified syntax table illustrating syntax elements signaled in a SPS. In this example, the subpicture partitioning present flag subpics_present_flag is only signaled in the SPS when the RPR enabled flag ref_pic_resampling_enabled_flag is equal to 0, that is, subpicture partitioning is allowed only when RPR is disabled. The value of the subpicture partitioning present flag subpics_present_flag is inferred to be 0 when this flag is not signaled in the SPS. The subpicture partitioning present flag equals to 1 specifying that subpicture related parameters are present in the SPS, and the subpicture partitioning present flag equals to 0 specifying that subpicture related parameters are not present in the SPS.

TABLE 4

| seq_parameter_set_rbsp( ) { | Descriptor |
|---|---|
| sps_decoding_parameter_set_id | u(4) |
| sps_video_parameter_set_id | u(4) |
| ... | |
| ref_pic_resampling_enabled_flag | u(1) |
| pic_width_max_in_luma_samples | ue(v) |
| pic_height_max_in_luma_samples | ue(v) |
| sps_log2_ctu_size_minus5 | u(2) |
| if(!ref_pic_resampling_enabled_flag) | |
|   subpics_present_flag | u(1) |
|   if(subpics_present_flag) { | |
|     sps_num_subpics_minus1 | u(8) |
|     for(i = 0; i <= sps_num_subpics_minus1; i++) { | |
|       subpic_ctu_top_left_x[i] | u(v) |
|       subpic_ctu_top_left_y[i] | u(v) |
|       subpic_width_minus1[i] | u(v) |
|       subpic_height_minus1[i] | u(v) |
|       subpic_treated_as_pic_flag[i] | u(1) |
|       loop_filter_across_subpic_enabled_flag[i] | u(1) |
|     } | |
|   } | |
| ... | |
| } | |

Table 5 shows a syntax table for a SPS illustrating another embodiment of disabling subpicture partitioning when RPR is enabled. In this embodiment, a resolution change flag sps_res_change_in_clvs_allowed_flag signaled in a SPS specifies whether the picture spatial resolution is changeable within a Coded Layer Video Sequence (CLVS) referring to the SPS. The picture spatial resolution does not change within any CLVS referring to the SPS when this resolution change flag sps_res_change_in_clvs_allowed_flag is equal to 0, and the picture resolution might change within a CLVS referring to the SPS when the resolution change flag sps_res_change_in_clvs_allowed_flag is equal to 1. A subpicture partitioning present flag sps_subpic_info_present_flag equals to 1 specifying that subpicture information is present for the CLVS and there might be one or more subpictures in each picture of the CLVS, and sps_subpic_info_present_flag equals to 0 specifying that subpicture information is not present for the CLVS and there is only one subpicture in each picture of the CLVS. In this example, when the resolution change flag sps_res_change_in_clvs_allowed_flag is equal to 1, the value of the subpicture partitioning present flag sps_subpic_info_present_flag shall be equal to 0. In other words, subpicture partitioning is constrained as subpicture information cannot be present for the CLVS in the SPS when the picture spatial resolution is changeable within a CLVS referring to the SPS. In one embodiment, when RPR is enabled, a subpicture partitioning present flag is allowed to be set to 1 only if the resolution change flag sps_res_change_in_clvs_allowed_flag is equal to 0, equivalently, when subpicture partitioning is enabled, a RPR enabled flag is allowed to be set to 1 only if the resolution change flag sps_res_change_in_clvs_allowed_flag is equal to 0.

TABLE 5

| seq_parameter_set_rbsp( ) { | Descriptor |
|---|---|
| sps_seq_parameter_set_id | u(4) |
| ... | |
| sps_gdr_enabled_flag | u(1) |
| sps_ref_pic_resampling_enabled_flag | u(1) |
| if(sps_ref_pic_resampling_enabled_flag) | |
|   sps_res_change_in_clvs_allowed_flag | u(1) |
| ... | |
| sps_subpic_info_present_flag | u(1) |
| if(sps_subpic_info_present_flag) { | |
| ... | |
| sps_subpic_id_len_minus1 | uv(v) |
| sps_subpic_id_mapping_explicitly_signalled_flag | u(1) |
| if(sps_subpic_id_mapping_explicitly_signalled_flag) { | |
|   sps_subpic_id_mapping_present_flag | u(1) |
|   if(sps_subpic_id_mapping_present_flag) | |
|     for(i = 0; i <= sps_num_subpics_minus1; i ++) | |
|       Sps_subpic_id[i] | u(1) |
| } | |
| } | |
| ... | |

A syntax element sps_subpic_id_len_minus1 plus 1 specifies the number of bits used to represent the syntax element sps_subpic_id[i], the syntax element pps_subpic_id [i], and the syntax element sh_subpic_id. The value of sps_subpic_id_len_minus1 shall be in the range of 0 to 15, inclusive. The value of 1<<(sps_subpic_id_len_minus1+1) shall be greater than or equal to sps_num_subpics_minus1+1. A syntax element sps_subpic_id_mapping_explicitly_signalled_flag equals to 1 specifying that the subpicture Identification (ID) mapping is explicitly signaled, either in the SPS or in the PPSs referred to by coded pictures of the CLVS. This syntax element equals to 0 specifying that subpicture ID mapping is not explicitly signaled for the CLVS, and the value of this syntax element is inferred to be equal to 0 when not present. A syntax element sps_subpic_id_mapping_present_flag equals to 1 specifying that the subpicture ID mapping is signaled in the SPS when sps_subpic_id_mapping_explicilty_signalled_flag is equal to 1. This syntax element sps_subpic_id_mapping_present_flag equals to 0 specifying that subpicture ID mapping is signaled in the PPSs referred to by coded pictures of the CLVS when sps_subpic_id_mapping_explicitly_signalled_flag is equal to 1. A syntax element sps_subpic_id[i] specifies the subpictureID of the i-th subpicture. The length of the sps_subpic_id[i] syntax element is sps_subpic_id_len_minus1+1 bits.

Inferring Subpicture ID Flag when Subpicture Partitioning is Disabled In some embodiments of the present invention, a video encoder or decoder encodes or decodes a first syntax flag indicating whether subpicture partitioning is enabled or disabled in a high-level syntax set. For example, the first syntax flag is the subpicture partitioning present flag subpics_present_flag signaled in the SPS. A related subpicture layout is signaled when the first syntax flag is equal to 1; otherwise the related subpicture information is not signaled. The video encoder or decoder may further encodes or decodes a second syntax flag indicating whether information related to subpicture IDs shall be further signaled. In some embodiments of the present invention, the second syntax flag is not coded and is inferred to be equal to 0 when the subpicture partitioning present flag is equal to 0. An example of the second syntax flag is a subpicture partitioning ID present flag sps_subpic_id_present_flag signaled in the SPS. The subpicture partitioning ID present flag equals to 1 specifying that subpicture ID mapping is present in the SPS, and sps_subpic_id_present_flag equals to 0 specifying that subpicture ID mapping is not present in the SPS. An exemplary syntax table illustrated in Table 6 demonstrates an embodiment of inferring a subpicture ID flag when subpicture partitioning is disabled. In this embodiment, the subpicture partitioning ID present flag sps_subpic_id_present_flag is only signaled in the SPS when the subpicture partitioning present flag subpics_present_flag is equal to 1, which implies the subpicture partitioning ID present flag sps_subpic_id_present_flag is not present in the SPS when the subpicture partitioning present flag subpics_present_flag is equal to 0. The subpicture partitioning ID present flag sps_subpic_id_present_flag is inferred to be equal to 0 when it is not present.

TABLE 6

| seq_parameter_set_rbsp( ) { | Descriptor |
|---|---|
| sps_decoding_parameter_set_id | u(4) |
| sps_video_parameter_set_id | u(4) |
| ... | |
| ref_pic_resampling_enabled_flag | u(1) |
| pic_width_max_in_luma_samples | ue(v) |
| pic_height_max_in_luma_samples | ue(v) |
| sps_log2_ctu_size_minus5 | u(2) |
| subpics_present_flag | u(1) |
| if(subpics_present_flag) { | |
|   sps_num_subpics_minus1 | u(8) |
|   for( i = 0; i <= sps_num_subpics_minus1; i++) { | |
|     subpic_ctu_top_left_x[i] | u(v) |
|     subpic_ctu_top_left_y[i] | u(v) |
|     subpic_width_minus1[i] | u(v) |
|     subpic_height_minus1[i] | u(v) |
|     subpic_treated_as_pic_flag[i] | u(1) |
|     loop_filter_across_subpic_enabled_flag[i] | u(1) |
|   } | |
| } | |
| if(subpics_present_flag) | |
|   sps_subpic_id_present_flag | u(1) |
| if(sps_subpic_id_present_flag) { | |
|   sps_subpic_id_signalling_present_flag | u(1) |
|   if(sps_subpic_id_signalling_present_flag) { | |
|     sps_subpic_id_len_minus1 | ue(v) |
|     for( i = 0; i <= sps_num_subpics_minus1; i++) | |
|       sps_subpic_id[i] | u(v) |
|     } | |
|   } | |
| ... | |
| } | |

Figure 4:
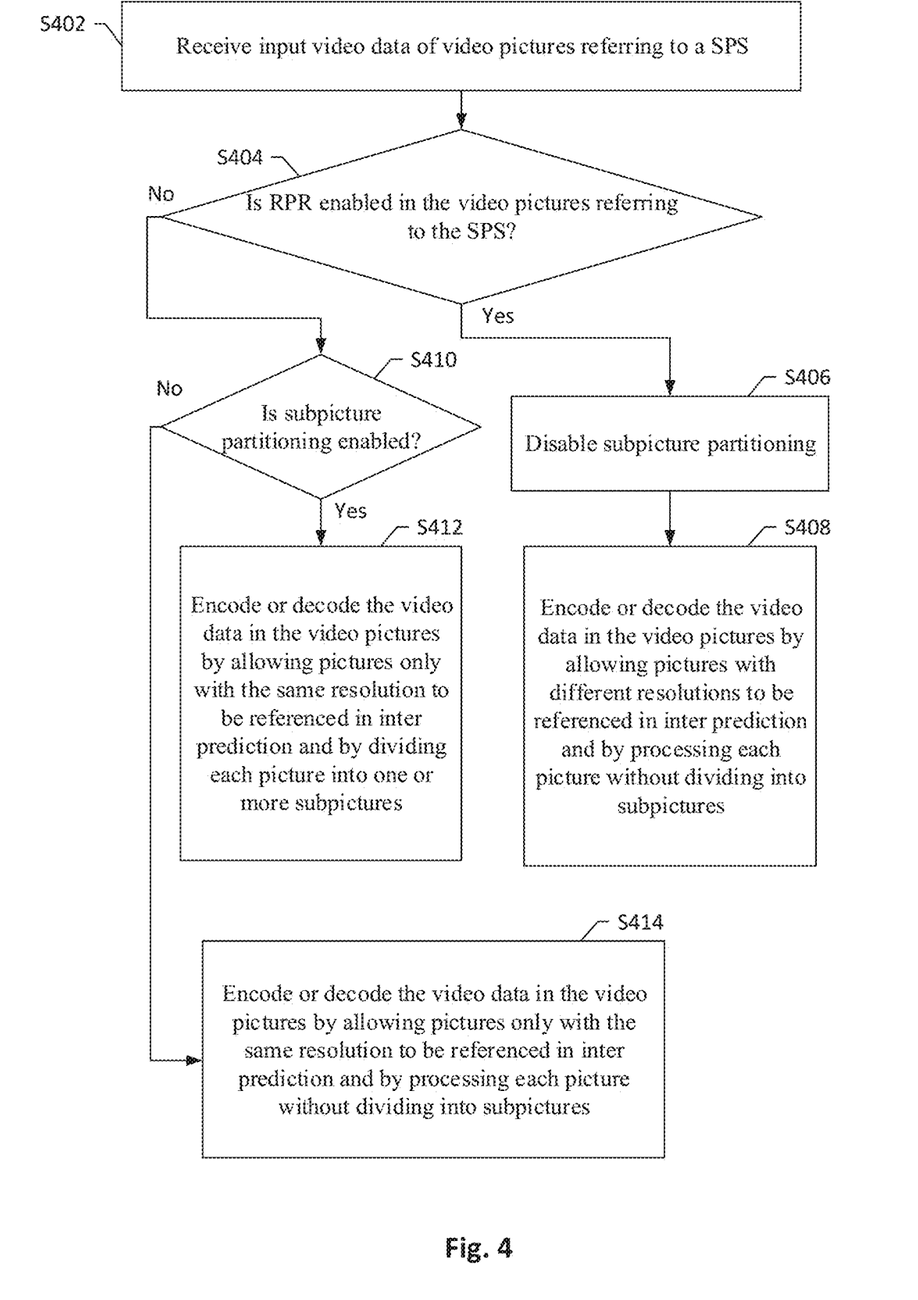
FIG. 4 illustrates an exemplary flowchart of a video encoding or decoding system demonstrating an embodiment of disabling subpicture partitioning when reference picture resampling is enabled.
Figure 5:
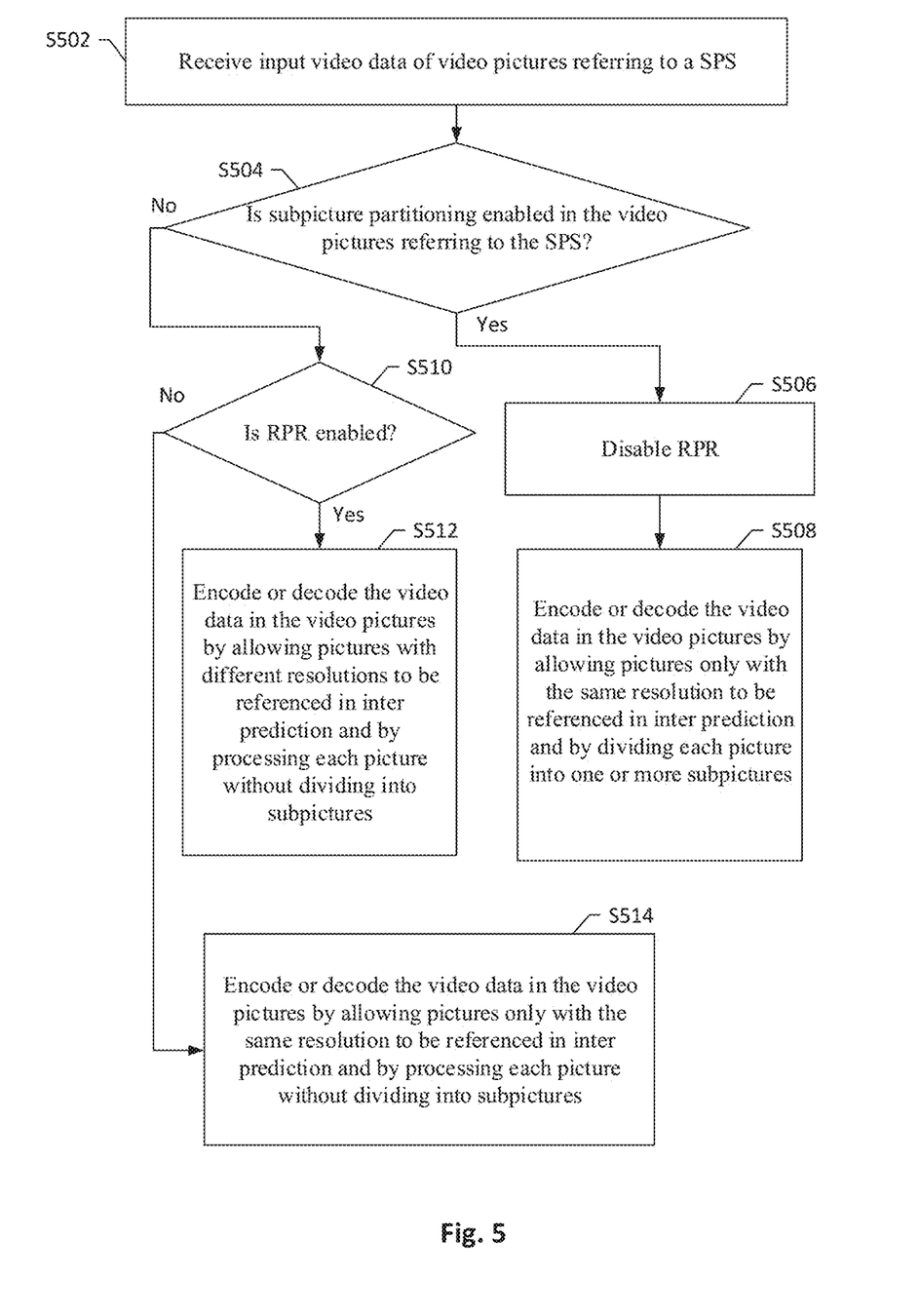
FIG. 5 illustrates an exemplary flowchart of a video encoding or decoding system demonstrating an embodiment of disabling reference picture resampling when subpicture partitioning is enabled.

Exemplary Flowchart for FIG. 4 and FIG. 5 illustrate exemplary flowcharts demonstrating embodiments of mutually exclusive the use of RPR and subpicture partitioning. A video encoding or decoding system in the embodiment as shown in FIG. 4 disables subpicture partitioning when RPR is enabled. The video encoding or decoding system receives input video data associated with video pictures referring to a SPS in step S402, and determines whether RPR is enabled in the video pictures referring to the SPS in step S404. For example, the video encoding system signals a first syntax element in the SPS specifying whether reference picture resampling is enabled or disabled, and the video decoding system determines whether RPR is enabled or disabled by parsing the first syntax element signaled in the SPS. In step S406, subpicture partitioning is disabled for the video pictures referring to the SPS when RPR is determined to be enabled for the video pictures in step S404. For example, the video encoding system will not signal a second syntax element specifying whether subpicture partitioning is enabled or disabled when the first syntax element indicates RPR is enabled, or the video decoding system infers the second syntax element to be 0 indicating subpicture partitioning is disabled. The video encoding or decoding system encodes or decodes the video data of the video pictures by allowing pictures with different resolutions to be referenced in inter prediction and by processing each picture without dividing into subpictures in step S408. In step S410, the video encoding or decoding further determines whether subpicture partitioning is enabled in the video pictures referring to the SPS when RPR is determined to be disabled for encoding or decoding the video pictures in step S404. For example, the video decoding system signals a second syntax element specifying whether subpicture partitioning is enabled or disabled, or the video decoding system determines whether subpicture partitioning is enabled or disabled by parsing the second syntax element from the SPS. In cases when subpicture partitioning is determined to be enabled in step S410, the video encoding or decoding system encodes or decodes the video data in the video pictures by allowing pictures only with the same resolution to be referenced in inter prediction and by dividing each picture into one or more subpictures in step S412. Otherwise, the video encoding or decoding system encodes or decodes the video data in the video pictures by allowing pictures only with the same resolution to be referenced in inter prediction and by processing each picture without dividing into subpictures in step S414 when both RPR and subpicture partitioning are disabled.

FIG. 5 illustrates the exemplary flowchart of a video encoding or decoding system for demonstrating the embodiment of disabling RPR when subpicture partitioning is enabled. A video encoding or decoding system receives input video data of video pictures referring to a SPS in step S502, and determines whether subpicture partitioning is enabled in the video pictures referring to the SPS in step S504. For example, the video decoding system determines subpicture partitioning is enabled or disabled by parsing a second syntax element signaled in the SPS. RPR is disabled for video pictures referring to the SPS in step S506 when subpicture partitioning is enabled. For example, the video encoding system will not signal a first syntax element specifying whether RPR is enabled or disabled in the SPS when subpicture partitioning is enabled, or the video decoding system infers this first syntax element to be 0 specifying RPR is disabled when the second syntax element specifies subpicture partitioning is enabled. The video encoding or decoding system encodes or decodes the video data in the video pictures referring to the SPS by allowing pictures only with the same resolution to be referenced in inter prediction and by dividing each picture into one or more subpictures in step S508. The video encoding or decoding system further determines if RPR is enabled in the video pictures referring to the SPS in step S510. For example, the video encoding system signals the first syntax element in the SPS specifying whether RPR is enabled or disabled, or the video decoding system determines whether RPR is enabled or disabled by parsing the first syntax element from the SPS. In step 512, the video data in the video pictures referring to the SPS are encoded or decoded by allowing pictures with different resolutions to be referenced in inter prediction and by processing each picture without dividing into subpictures when RPR is determined to be enabled. The video data in the video pictures are encoded or decoded by only allowing pictures with the same resolution to be referenced in inter prediction and by processing each picture without dividing into subpictures in step S514 as both RPR and subpicture partitioning are disabled.

Figure 6:
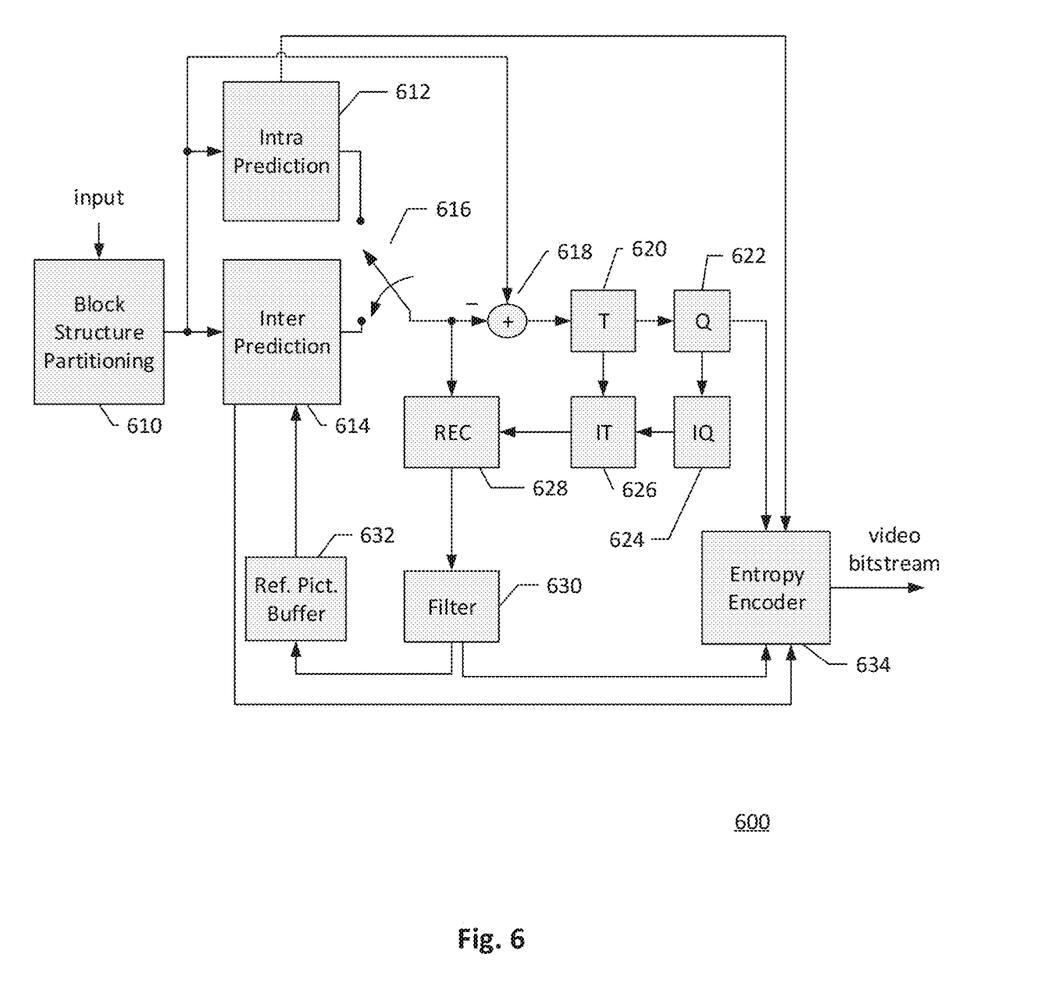
FIG. 6 illustrates an exemplary system block diagram for a video encoding system incorporating the video processing method according to embodiments of the present invention.

Video Encoder and Decoder Implementations The foregoing proposed video processing methods related to high-level information signaling can be implemented in video encoders or decoders. FIG. 6 illustrates an exemplary system block diagram for a Video Encoder 600 implementing one or more of the various embodiments of the present invention. According to some embodiments, it is a requirement of the bitstream conformance that the RPR and subpicture partitioning cannot be enabled at the same time. For example, when RPR is enabled, the video encoder signals a first syntax element specifying RPR is enabled in a SPS, and skips signaling a second syntax element specifying whether subpicture partitioning is disabled or constrained. Subpicture partitioning is inferred to be disabled when the second syntax element is not present in the SPS. In another example, when subpicture partitioning is enabled, the video encoder signals a second syntax element specifying subpicture partitioning is enabled in a SPS, and skips signaling a first syntax element specifying whether RPR is disabled or constrained. RPR is inferred to be disabled when the first syntax element is not present in the SPS. In some other embodiments, it is a requirement of the bitstream conformance that subpicture partitioning is constrained when RPR is enabled or RPR is constrained when subpicture partitioning is enabled. An Intra Prediction module 610 provides intra predictors based on reconstructed video data of a current picture. An Inter Prediction module 612 performs Motion Estimation (ME) and Motion Compensation (MC) to provide inter predictors based on video data from other picture or pictures. Either the Intra Prediction module 610 or Inter Prediction 612 supplies the selected predictor to an Adder 616 to form prediction errors, also called prediction residual. The prediction residual of the current block are further processed by a Transformation module (T) 618 followed by a Quantization module (Q) 620. The transformed and quantized residual signal is then encoded by an Entropy Encoder 632 to form a video bitstream. The video bitstream is then packed with side information. The transformed and quantized residual signal of the current block is then processed by an Inverse Quantization module (IQ) 622 and an Inverse Transformation module (IT) 624 to recover the prediction residual. As shown in FIG. 6, the prediction residual is recovered by adding back to the selected predictor at a Reconstruction module (REC) 626 to produce reconstructed video data. The reconstructed video data may be stored in a Reference Picture Buffer (Ref. Pict. Buffer) 630 and used for prediction of other pictures. The reconstructed video data recovered from the REC module 626 may be subject to various impairments due to encoding processing; consequently, an In-loop Processing Filter 628 is applied to the reconstructed video data before storing in the Reference Picture Buffer 630 to further enhance picture quality.

Figure 7:
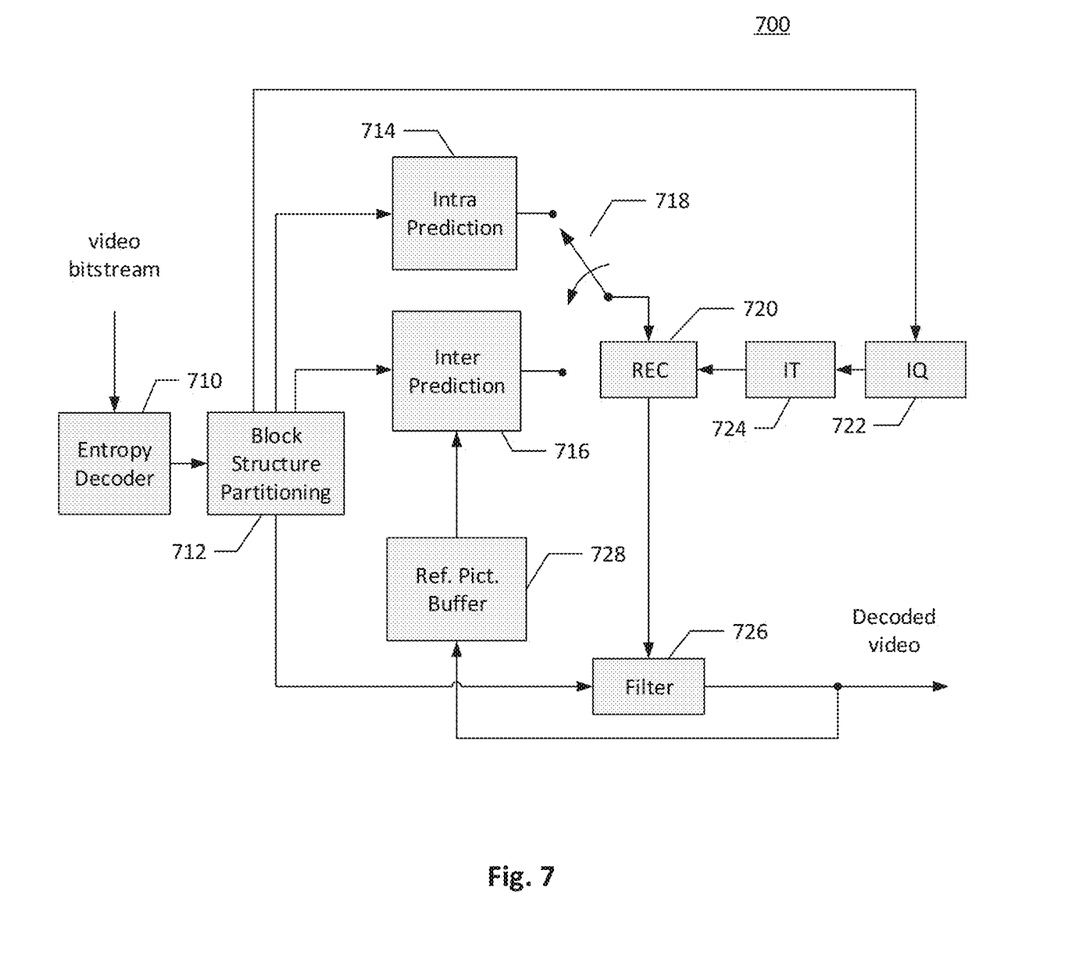
FIG. 7 illustrates an exemplary system block diagram for a video decoding system incorporating the video processing method according to embodiments of the present invention.

A corresponding Video Decoder 700 for decoding the video bitstream generated from the Video Encoder 600 of FIG. 6 is shown in FIG. 7. In some examples of the present invention, a first syntax element signaled in a high-level syntax set indicates whether RPR is disabled or constrained, and a second syntax element signaled in the high-level syntax set indicates whether subpicture partitioning is disabled or constrained. For example, the first syntax element is a RPR enabling flag and the second syntax element is a subpicture partitioning present flag signaled in a SPS. In one embodiment, the RPR enabling flag is inferred to be 0 when the subpicture partitioning present flag is equal to 1, and in another embodiments, the subpicture partitioning present flag is inferred to be 0 when the RPR enabling flag is equal to 1. In yet another embodiment, the first syntax element is a resolution change flag and the second syntax element is a subpicture partitioning present flag, where the subpicture partitioning present flag is constrained so that this subpicture partitioning present flag is allowed to be set to 1 only when the resolution change flag is equal to 0. The video bitstream is the input to the Video Decoder 700 and is decoded by an Entropy Decoder 710 to parse and recover the transformed and quantized residual signal and other system information. The decoding process of the Decoder 700 is similar to the reconstruction loop at the Encoder 600, except the Decoder 700 only requires motion compensation prediction in an Inter Prediction 714. Each block is decoded by either an Intra Prediction module 712 or Inter Prediction module 714. A Switch 716 selects an intra predictor from the Intra Prediction module 712 or an inter predictor from the Inter Prediction module 714 according to decoded mode information. The transformed and quantized residual signal associated with each block is recovered by an Inverse Quantization module (IQ) 720 and an Inverse Transformation module (IT) 722. The recovered residual signal is reconstructed by adding back the predictor in a REC module 718 to produce reconstructed video. The reconstructed video is further processed by an In-loop Processing Filter (Filter) 724 to generate final decoded video. If the currently decoded picture is a reference picture for later pictures in decoding order, the reconstructed video of the currently decoded picture is also stored in the Ref. Pict. Buffer 726.

Various components of Video Encoder 600 and Video Decoder 700 in FIG. 6 and FIG. 7 may be implemented by hardware components, one or more processors configured to execute program instructions stored in a memory, or a combination of hardware and processor. For example, a processor executes program instructions to control receiving of input data associated with video pictures referring to a high-level syntax set. The processor is equipped with a single or multiple processing cores. In some examples, the processor executes program instructions to perform functions in some components in Encoder 600 and Decoder 700, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 6 and 7, Encoder 600 and Decoder 700 may be implemented in the same electronic device, so various functional components of Encoder 600 and Decoder 700 may be shared or reused if implemented in the same electronic device.

Embodiments of the video processing method for encoding or decoding may be implemented in a circuit integrated into a video compression chip or program codes integrated into video compression software to perform the processing described above. For examples, encoding or decoding with subpicture partitioning or reference picture resampling may be realized in program codes to be executed on a computer processor, a Digital Signal Processor (DSP), a microprocessor, or field programmable gate array (FPGA). These processors can be configured to perform particular tasks according to the invention, by executing machine-readable software codes or firmware codes that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

What is claimed is:

1. A video processing method in a video encoding or decoding system, comprising:
    receiving input video data of video pictures referring to a high-level syntax set;
    determining a first syntax element signaled or to be signaled in the high-level syntax set indicating whether reference picture resampling is disabled or constrained for the video pictures associated with the high-level syntax set;
    determining a second syntax element indicating whether subpicture partitioning is disabled or constrained for the video pictures associated with the high-level syntax set, wherein the first syntax element and the second syntax element are restricted to disable or constrain subpicture partitioning when reference picture resampling is enabled; and
    encoding or decoding the video pictures by allowing pictures with different resolutions to be referenced in inter prediction when reference picture resampling is enabled or allowing pictures only with a same resolution to be referenced in inter prediction when reference picture resampling is disabled, and encoding or decoding the video pictures by dividing each picture into one or more subpictures when subpicture partitioning is enabled or by processing each picture without dividing into subpictures when subpicture partitioning is disabled.

2. The method of claim 1, wherein the high-level syntax set is a Sequence Parameter Set (SPS).

3. The method of claim 1, wherein the second syntax element is conditionally signaled in the high-level syntax set and the second syntax element is only signaled when reference picture resampling is disabled.

4. The method of claim 1, wherein all the video pictures referring to the high-level syntax set have a same derived value of a scaling window width and a same derived value of a scaling window height when subpicture partitioning is enabled.

5. The method of claim 4, wherein the scaling window width for a picture is derived from a picture width, a left scaling window offset, and a right scaling window offset signaled in a Picture Parameter Set (PPS) referred to by the picture, and the scaling window height for the picture is derived from a picture height, a top scaling window offset, and a bottom scaling window offset.

6. The method of claim 1, wherein the first and second syntax elements are restricted to disable or constrain subpicture partitioning when reference picture resampling is enabled or the first and second syntax elements are restricted to disable or constrain reference picture resampling when subpicture partitioning is enabled.

7. The method of claim 6, wherein the first syntax element is conditionally signaled in the high-level syntax set and the first syntax element is only signaled when subpicture partitioning is disabled.

8. The method of claim 6, wherein the first syntax element is a reference picture resampling enabling flag specifying whether reference picture resampling is enabled, and the second syntax element is a subpicture partitioning present flag specifying whether subpicture parameters are present in the high-level syntax set.

9. The method of claim 8, wherein the reference picture resampling enabling flag is inferred to be equal to 0 or is not signaled when the subpicture partitioning present flag is equal to 1, and the reference picture resampling enabling flag is only signaled in the high-level syntax set when the subpicture partitioning present flag is equal to 0, wherein the reference picture resampling enabling flag is inferred to be equal to 0 when the reference picture resampling enabling flag is not signaled.

10. The method of claim 8, wherein the subpicture partitioning present flag is inferred to be equal to 0 or is not signaled when the reference picture resampling enabling flag is equal to 1, and the subpicture partitioning present flag is only signaled in the high-level syntax set when the reference picture resampling enabling flag is equal to 0, wherein the subpicture partitioning present flag is inferred to be equal to 0 when the subpicture partitioning present flag is not signaled.

11. The method of claim 1, wherein the first syntax element is a resolution change flag specifying whether a picture spatial resolution is changeable within a Coded Layer Video Sequence (CLVS), and the second syntax element is a subpicture partitioning present flag specifying whether subpicture information is present for the CLVS in the high-level syntax set.

12. The method of claim 11, wherein the subpicture information is not present for the CLVS in the high-level syntax set when the picture spatial resolution is changeable within the CLVS referring to the high-level syntax set by inferring subpicture partitioning present flag to be equal to 0 when the resolution change flag is equal to 1.

13. The method of claim 1, further comprising determining a third syntax element according to the second syntax element, wherein the second syntax element is a subpicture partitioning present flag specifying whether subpicture information is present for a CLVS in the high-level syntax set, and the third syntax element is a subpicture Identification (ID) flag specifying whether subpicture ID mapping is present in the high-level syntax set.

14. The method of claim 13, further comprising determining a related subpicture layout when the subpicture partitioning present flag is equal to 1.

15. The method of claim 13, wherein the subpicture ID flag is not coded and is inferred to be equal to 0 when the subpicture partitioning present flag is equal to 0, and the subpicture ID flag is only signaled in the high-level syntax set when the subpicture partitioning present flag is equal to 1.

16. An apparatus of processing video data in a video encoding or decoding system, the apparatus comprising one or more electronic circuits configured for:

receiving input video data of video pictures referring to a high-level syntax set;

determining a first syntax element signaled or to be signaled in the high-level syntax set indicating whether reference picture resampling is disabled or constrained for the video pictures associated with the high-level syntax set;

determining a second syntax element indicating whether subpicture partitioning is disabled or constrained for the video pictures associated with the high-level syntax set, wherein the first syntax element and the second syntax element are restricted to disable or constrain subpicture partitioning when reference picture resampling is enabled; and encoding or decoding the video pictures by allowing pictures with different resolutions to be referenced in inter prediction when reference picture resampling is enabled or allowing pictures only with a same resolution to be referenced in inter prediction when reference picture resampling is disabled, and encoding or decoding the video pictures by dividing each picture into one or more subpictures when subpicture partitioning is enabled or by processing each picture without dividing into subpictures when subpicture partitioning is disabled.

17. A non-transitory computer readable medium storing program instruction causing a processing circuit of an apparatus to perform a video processing method for video data, and the method comprising:

receiving input video data of video pictures referring to a high-level syntax set;

determining a first syntax element signaled or to be signaled in the high-level syntax set indicating whether reference picture resampling is disabled or constrained for the video pictures associated with the high-level syntax set;

determining a second syntax element indicating whether subpicture partitioning is disabled or constrained for the video pictures associated with the high-level syntax set, wherein the first syntax element and the second syntax element are restricted to disable or constrain subpicture partitioning when reference picture resampling is enabled; and encoding or decoding the video pictures by allowing pictures with different resolutions to be referenced in inter prediction when reference picture resampling is enabled or allowing pictures only with a same resolution to be referenced in inter prediction when reference picture resampling is disabled, and encoding or decoding the video pictures by dividing each picture into one or more subpictures when subpicture partitioning is enabled or by processing each picture without dividing into subpictures when subpicture partitioning is disabled.

* * * * *